US011159638B2

(12) United States Patent
Chopra et al.

(10) Patent No.: US 11,159,638 B2
(45) Date of Patent: Oct. 26, 2021

(54) DYNAMIC DOCUMENT ACCESS CONTROL IN A CONTENT MANAGEMENT SYSTEM

(71) Applicant: Veeva Systems Inc., Pleasanton, CA (US)

(72) Inventors: Sandeep Chopra, San Jose, CA (US); Zhanye Tong, San Ramon, CA (US); Eric Z Batzdorff, Alameda, CA (US); Jon Stone, Manteca, CA (US); Tao Wang, Pleasanton, CA (US)

(73) Assignee: Veeva Systems Inc., Pleasanton, CA (US)

( * ) Notice: Subject to any disclaimer, the term of this patent is extended or adjusted under 35 U.S.C. 154(b) by 1144 days.

(21) Appl. No.: 15/143,206

(22) Filed: Apr. 29, 2016

(65) Prior Publication Data

US 2017/0318120 A1    Nov. 2, 2017

(51) Int. Cl.
*H04L 29/08*    (2006.01)

(52) U.S. Cl.
CPC ............ *H04L 67/306* (2013.01); *H04L 67/10* (2013.01); *H04L 67/36* (2013.01)

(58) Field of Classification Search
CPC ........ H04L 67/306; H04L 67/10; H04L 67/36
USPC .......................................................... 709/205
See application file for complete search history.

(56) References Cited

U.S. PATENT DOCUMENTS

| 2002/0019827 | A1* | 2/2002 | Shiman | G06F 17/30011 |
| 2008/0091761 | A1* | 4/2008 | Tsao | G06F 9/526 |
| | | | | 709/201 |
| 2010/0043070 | A1* | 2/2010 | Okada | G06F 21/6209 |
| | | | | 726/21 |
| 2016/0314519 | A1* | 10/2016 | Liu | G06Q 30/0641 |

* cited by examiner

*Primary Examiner* — Vivek Srivastava (57) ABSTRACT

Systems and methods for controlling document access in a content management system. A user setup record may be saved for each user, and user groups may be generated based on attributes of user setup records. When a user group is stamped to a document in the content management system, all users in that user group get access to the document.

16 Claims, 9 Drawing Sheets

| Name | User | Role | Doc Type | Product | Country |
| --- | --- | --- | --- | --- | --- |
| DAC 001 | John Smith | Reviewer | Digital | Coldcap | USA |
| DAC 002 | Joan White | Owner | | Restalot | Canada |

DYNAMIC DOCUMENT ACCESS CONTROL IN A CONTENT MANAGEMENT SYSTEM

BACKGROUND

The subject technology relates generally to content management, and more particularly to controlling document access in enterprise content management.

Users increasingly depend on content management systems because of their ubiquitous and managed access, from anywhere, at any time, from any device. However, because of the large volume of documents in content management systems, large number of users, and their different permissions to access the documents, managing document access has been a massive and very time consuming operation.

SUMMARY

The disclosed subject matter relates to a method for controlling document access in a content management system. The method comprises: displaying a first user interface for receiving user setup records, wherein each user setup record comprises a user role field and a product field. The method further comprises: receiving and storing a first user setup record and a second user setup record, wherein the first user setup record comprises a first user role and a first product, and the second user setup record comprises a second user role and a second product. The method further comprises: generating a first user group and a second user group; assigning the first user to the first user group when attributes of the first user setup record satisfy requirements of the first user group, and assigning the second user to the second user group when attributes of the second user setup record satisfy requirements of the second user group; and displaying a second user interface for receiving definition of a matching rule for matching the user groups to the documents, wherein the second user interface comprises a first field of the first user setup record, and a window for receiving a first attribute of the first document which matches the first field of the first user setup record. The method further comprises: receiving definition of the matching rule; and determining that the first user group matches the first document based on the matching rule, the first user setup record, and attributes of the first document.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

Figure 1:
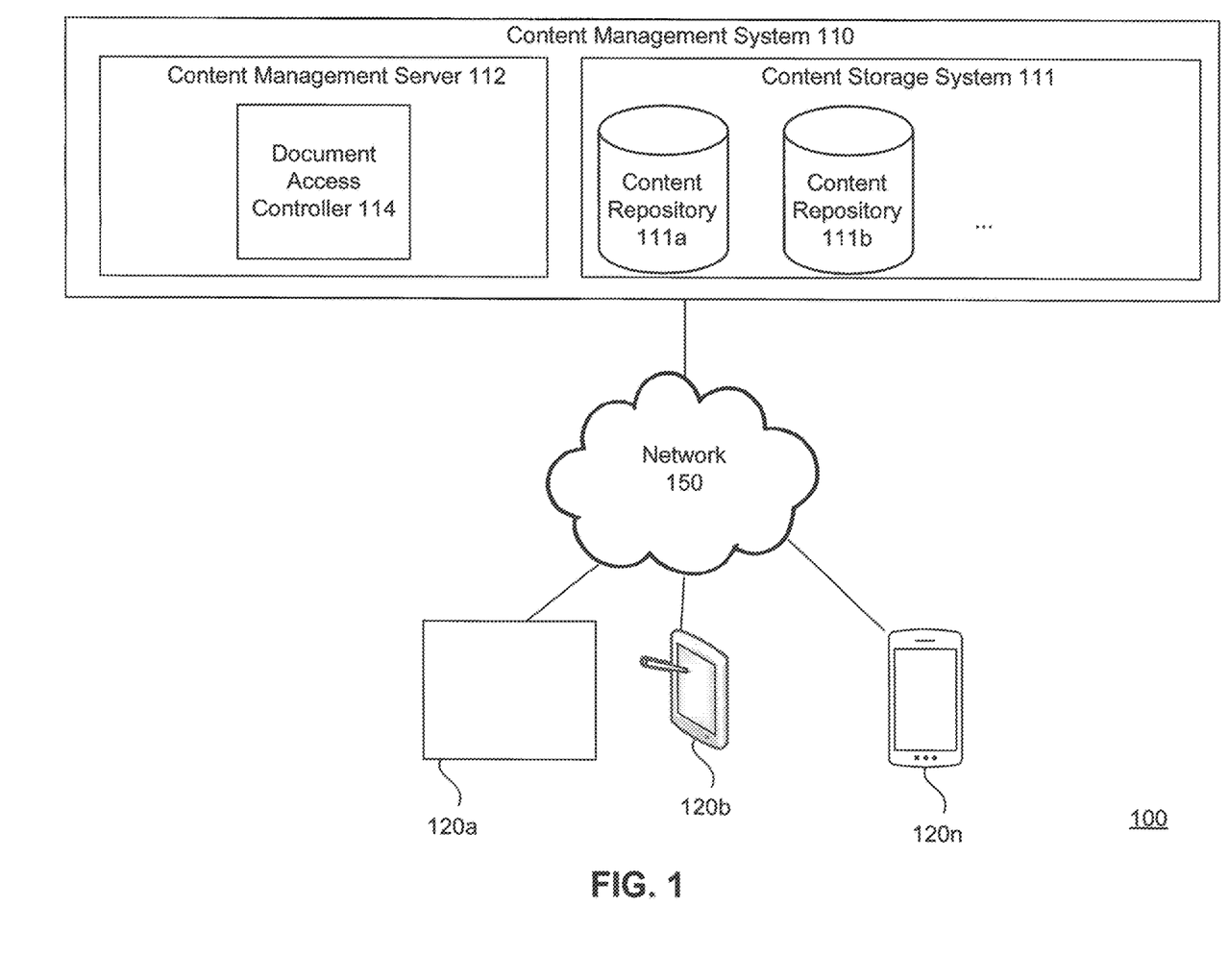
FIG. 1 illustrates an example high level block diagram of an enterprise content management architecture wherein the present invention may be implemented.

FIG. 1 illustrates an example high level block diagram of an enterprise content management architecture 100 wherein the present invention may be implemented. The enterprise may be a business, or an organization. As shown, the architecture 100 may include a content management system 110, and a plurality of user computing devices 120$a$, 120$b$, ... 120$n$, coupled to each other via a network 150. The content management system 110 may include a content storage system 111 and a content management server 112. The content storage system 111 may have one or more content repositories, e.g., 111$a$ and 111$b$. The network 150 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 120$a$-120$n$ may be any machine or system that is used by a user to access the content management system 110 via the network 150, and may be any commercially available computing devices including laptop computers, desktop computers, mobile phones, smart phones, tablet computers, netbooks, and personal digital assistants (PDAs).

The content storage system 111 may store content that user computing devices 120$a$-120$n$ may access. Each content repository (e.g., 111$a$ or 111$b$) may store a specific category of content, and allow users to interact with its content in a specific business context.

The content management server 112 is typically a remote computer system accessible over a remote or local network, such as the network 150. In one implementation, the content management server 112 may have, a document access controller 114 which may control the process for setting up user roles, generating user groups, matching user groups and documents, and stamping user groups on matching documents, as will be described in detail below.

In one implementation, the content management system 110 may be a multi-tenant system where various elements of hardware and software may be shared by one or more customers. For instance, a server may simultaneously process requests from a plurality of customers, and the content storage system 111 may store content for a plurality of customers. In a multi-tenant system, a user is typically associated with a particular customer. In one example, a user could be an employee of one of a number of pharmaceutical companies which are tenants, or customers, of the content management system 110.

In one embodiment, the content management system 110 may run on a cloud computing platform. Users can access content on the cloud independently by using a virtual machine image, or purchasing access to a service maintained by a cloud database provider.

In one embodiment, the content management system 110 may be provided as Software as a Service ("SaaS") to allow users to access the content management system 110 with a thin client.

Figure 2:
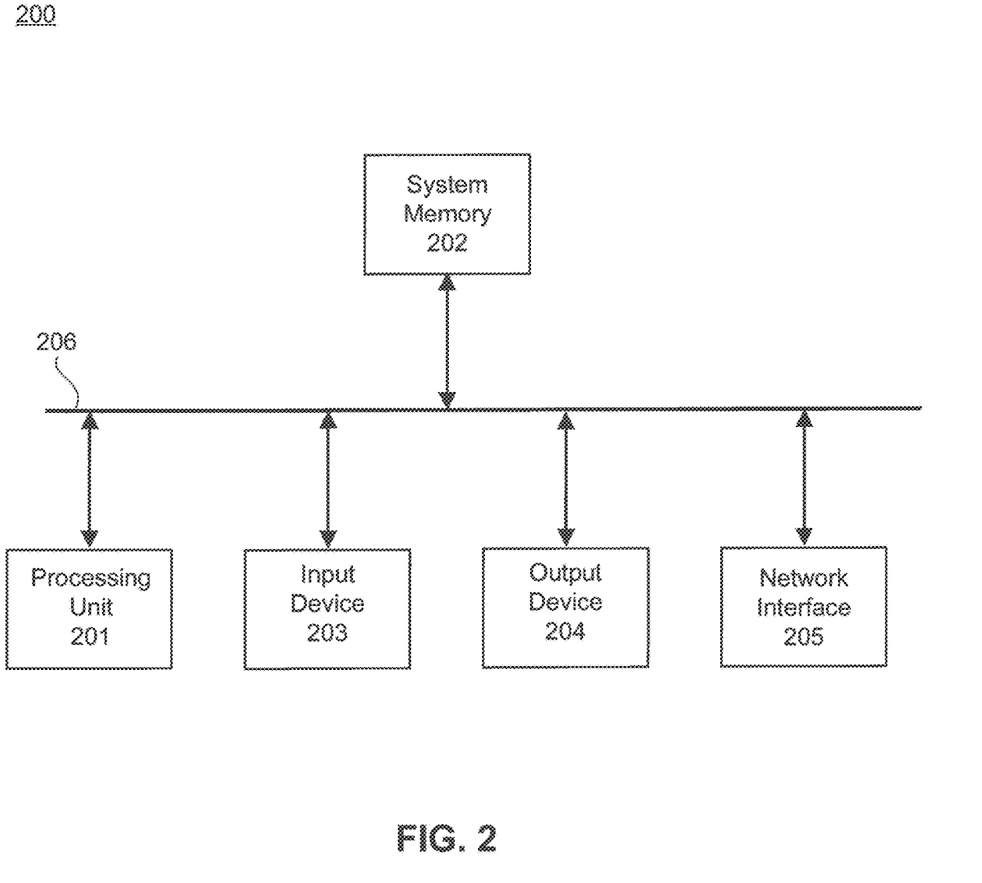
FIG. 2 illustrates an example high level block diagram of a computing device.

FIG. 2 illustrates an example block diagram of a computing device 200 which can be used as the user computing devices 120a-120n, and the content management server 112 in FIG. 1. The computing device 200 is only one example of a suitable computing environment and is not intended to suggest any limitation as to scope of use or functionality. The computing device 200 may include a processing unit 201, a system memory 202, an input device 203, an output device 204, a network interface 205 and a system bus 206 that couples these components to each other.

The processing unit 201 may be configured to execute computer instructions that are stored in a computer-readable medium, for example, the system memory 202. The processing unit 201 may be a central processing unit (CPU).

The system memory 202 typically includes a variety of computer readable media which may be any available media accessible by the processing unit 201. For instance, the system memory 202 may include computer storage media in the form of volatile and/or nonvolatile memory such as read only memory (ROM) and/or random access memory (RAM). By way of example, but not limitation, the system memory 202 may store instructions and data, e.g., an operating system, program modules, various application programs, and program data.

A user can enter commands and information to the computing device 200 through the input device 203. The input device 203 may be, e.g., a keyboard, a touchscreen input device, a touch pad, a mouse, a microphone, and/or a pen.

The computing device 200 may provide its output via the output device 304 which may be, e.g., a monitor or other type of display device, a speaker, or a printer.

The computing device 200, through the network interface 205, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 150) and/or buses. The network interface 205 may be configured to allow the computing device 200 to transmit and receive data in a network, for example, the network 150. The network interface 205 may include one or more network interface cards (NICs).

Figure 3:
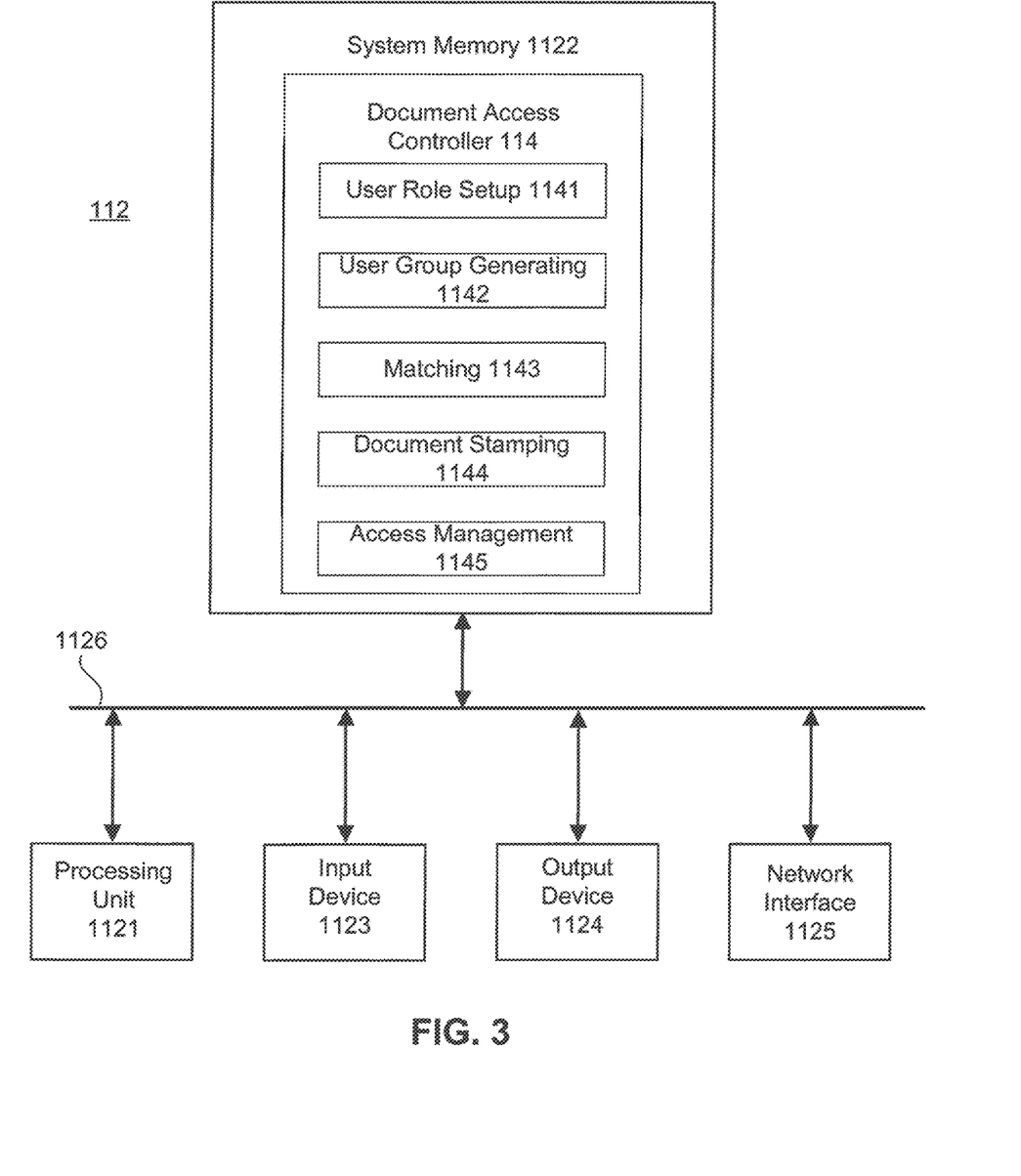
FIG. 3 illustrates an example high level block diagram of the content management server according to one embodiment of the present invention.

FIG. 3 illustrates an example high level block diagram of the content management server 112 according to one embodiment of the present invention. The content management server 112 may be implemented by the computing device 200, and may have a processing unit 1121, a system memory 1122, an input device 1123, an output device 1124, and a network interface 1125, coupled to each other via a system bus 1126. The document access controller 114 may include a user role setup module 1141, a user group generating module 1142, a matching module 1143, a document stamping module 1144, and an access management module 1145.

Figure 4:
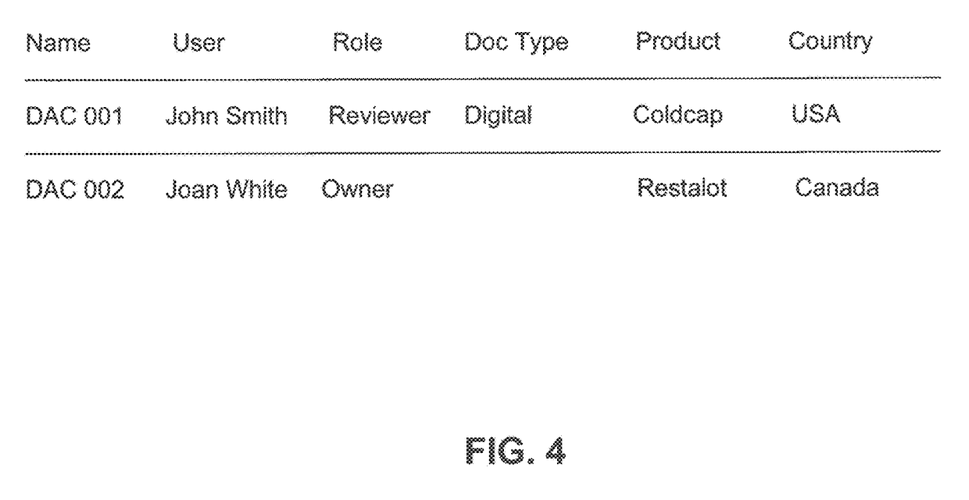
FIG. 4 illustrates an example user interface for receiving user setup records according to one embodiment of the present invention.

An enterprise may subscribe the content management service as a customer. Users may play different roles when accessing documents, e.g., owner and reviewer. The user role setup modulo 1141 may define one or more roles a user may play as to document access in an enterprise. In one implementation, user setup records may be used to define the roles. As shown in FIG. 4, the user setup records may be included in a table, and each user setup record may have one or more fields. The fields may define the user's access permissions based on his/her responsibilities and/or skillsets, and may include role, product, country, document type and other attributes.

A customer's system administrator may define what role(s) a user may play, assign users or employees different roles, and manage the roles with the user setup records. A system administrator may use attributes in fields of the user setup records to group users depending on its business need. The system administrator may select default fields and/or attributes provided by the content management system 110, or add new fields and/or attributes to customize user roles. In one example, one user setup record may define a user as a reviewer, who is familiar with a product Coldcap and a country Canada.

As users join the enterprise, move within the enterprise or leave the enterprise, the system administrator may add, modify or delete user setup records which define what kind of roles the users play. The system administrator may select a default role provided by the system, or create a new role. The user role setup module 1141 may display a user interface 400 shown in FIG. 4 to receive input from the system administrator, and process and store the information.

With the user setup records received from the customer's system administrator, the user group generating module 1142 may automatically generate user groups based on different combinations of attributes in the records. The groups may be, e.g., a Coldcap USA reviewer group for users who can review documents related to Coldcap in the U.S., and a Restalot Canada editor group for users who can edit documents related to Restalot in Canada.

Users may be assigned to appropriate user groups based on attributes of their user setup records. For example, if a user setup record is received via the user role setup module 1141 for a user who can review documents related to Coldcap in the U.S., that user may be automatically assigned to the Coldcap USA reviewer group. When a record is modified or deleted and does not have attributes associated with a user group anymore, that user may be pulled out of that user group.

Documents may also have a number of attributes, which may include document ID, product (e.g., Coldcap and Restalot) and country. A document attribute can either be single valued (i.e., for a single product or a single country), or multi-valued (i.e., for multiple products, or in different countries). The system administrator may then define a matching rule which may define how to match the user groups to the documents. The matching module 1143 may match user groups to appropriate documents with the matching rule.

Figure 5:
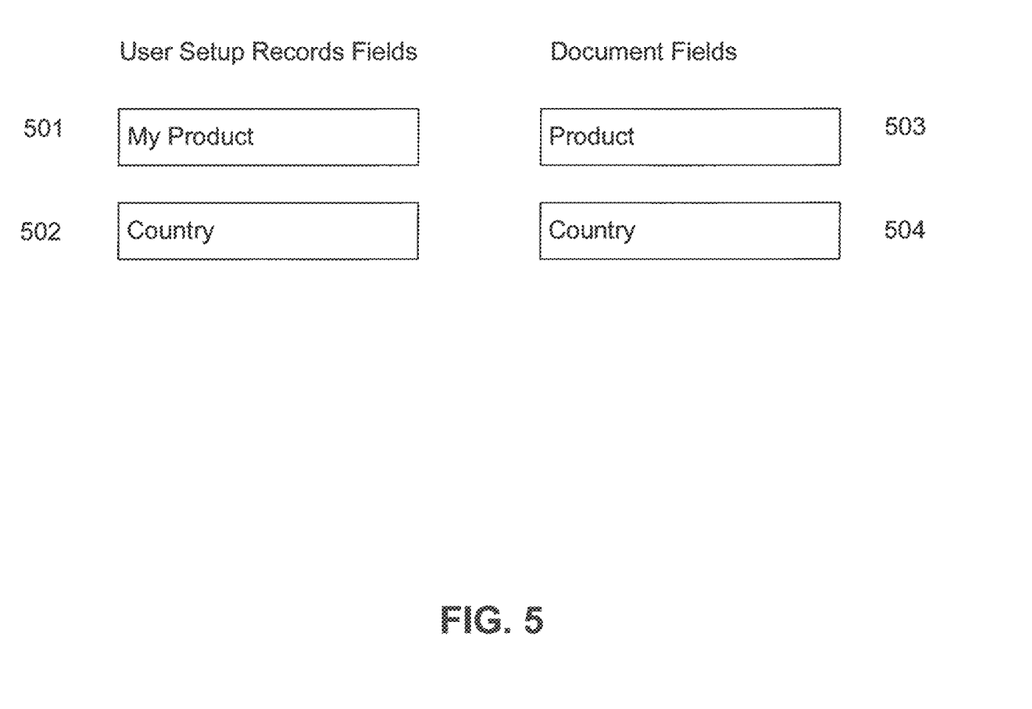
FIG. 5 illustrates an example user interface for receiving a matching rule definition according to one embodiment of the present invention.

In one implementation, the matching module 1143 may compare attributes associated with the user group (i.e., relevant attributes of user setup records in a user group) and the corresponding attributes of a document, e.g., product to product, and country to country. As shown in FIG. 5, a user interface 500 may display one or more fields of user setup objects, and allow the system administrator to select the matchable document field(s), or vice versa. In one implementation, when the system administrator clicks on a window 503 to select a matchable field for the My Product field in a window 501, a drop-down or pop-up window including a list of fields may be displayed for the system administrator to select. In one example, the matchable fields are selected based on their names. If their names are matchable, then the fields are matchable. In one example, the matching module 1143 may display fields of user setup objects and those of document, and line up matchable fields even when the names are not exactly the same, e.g., My Product in user setup object and Product in document attributes. This may allow the system administrator to match the fields up.

In one implementation, the matching rule may define the number of fields) to match. Some users may play roles for all products in one country, then only the country needs to be matched, not the product. Some users may play roles in all countries, but only some products, then the matching rule needs to be defined only based on products. For some users, it may be both.

The document stamping module 1144 may stamp a group to a document when they are matchable. For example, if Document 1's fields indicate that it is related to Coldcap in the U.S., the Coldcap US reviewer group may be stamped to it. In one implementation, a document field may be used to identify user groups having access right to the document for the document stamping.

When an existing rule is changed, some of the old document stamps may become obsolete because they are based on the old rule. The matching module 1143 may determine which old document stamps are based on the old rule, check all the groups related to the old rule and all the documents, and try to match them. The document stamping module 1144 may then stamp the documents with their new matchable groups. Events that may trigger document stamping from rule change may include adding and updating a matching rule, changing the status of a matching rule (e.g., activate and deactivate) and removing a matching rule.

The matching module 1143 may interpret the rules at setup time and the document stamping module 1144 may stamp the user groups to the documents at setup time as well. Once it is done, at the run time, when a user searches the documents, the document access controller 114 may know immediately what kind of role he/she may play on what document without further interpretation of the rules. The present invention evaluates the rules when they are created, modified, deleted, or when the documents are created and updated.

Figure 6A:
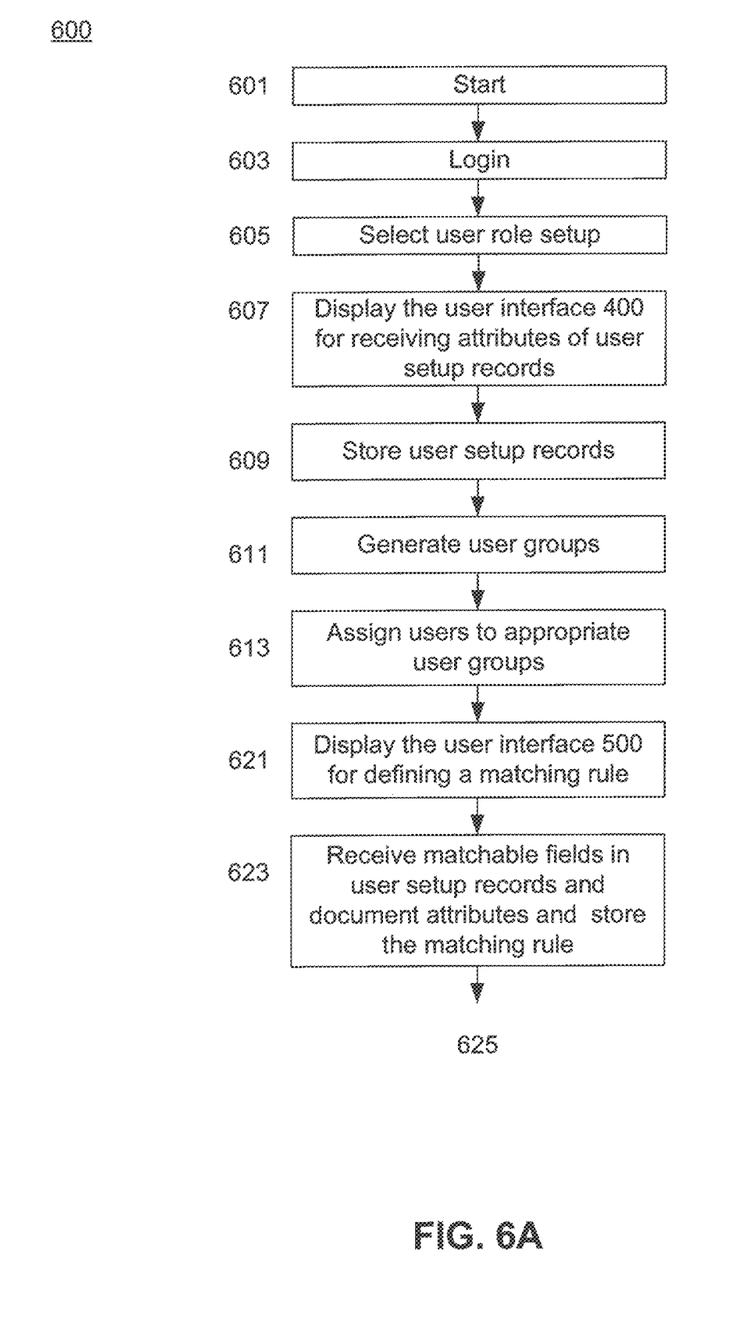
FIGS. 6A and 6B illustrate an example flowchart of a method for configuring the document access controller according to one embodiment of the present invention.
Figure 6B:
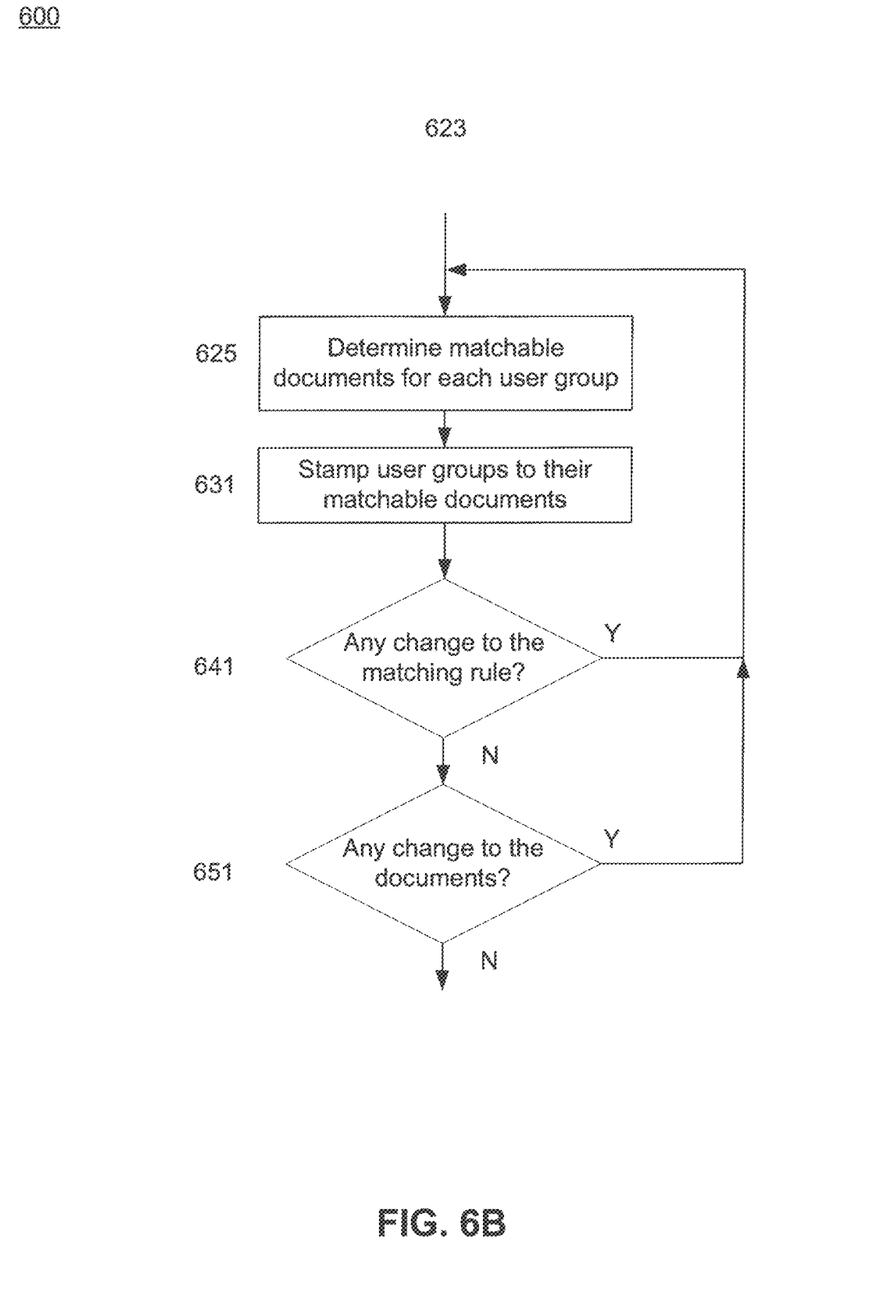

FIGS. 6A and 6B illustrate an example flowchart of a method for configuring the document access controller 114 according to one embodiment of the present invention. The method may start at 601.

At 603, a system administrator may login to the content management system 110.

At 605, the system administrator may select user role setup.

At 607, the user interface 400, as show in FIG. 4, may be displayed for the system administrator to input attributes of user setup records.

At 609, the user setup records may be received and stored, e.g., in the system memory 1122.

At 611, the user group generating module 1142 may check the user setup records, and generate user groups based on different combinations of attributes of the records. In one example, the user setup records may include a product field (e.g., Coldcap and Restalot), country field (e.g., USA and Canada) and a role field (e.g., reviewer and owner). A user group may be generated for each different combination of attributes in these three fields based on user setup records.

Consequently, eight groups may be generated, which may include reviewers of documents related to Coldcap in USA, reviewers of documents related to Coldcap in Canada, owners of documents related to Coldcap in USA, owners of documents related to Coldcap in Canada, reviewers of documents related to Restalot in USA, reviewers of documents related to Restalot in Canada, owners of documents related to Restalot in USA and owners of documents related to Restalot in Canada.

At 613, users may be assigned to the user groups based on attributes of their user setup records. In one example, when a user setup record indicates that the user is a reviewer of documents related to Coldcap in the U.S., he may be assigned to the Coldcap USA reviewer group.

At 621, a user interface 500, as shown in FIG. 5, may be displayed for the system administrator to define the matching rule.

At 623, matchable fields of user setup records in a user group and document attributes may be received on the user interface 500 and the matching rule may be stored in the system memory 1122.

At 625, matchable documents for each user group may be determined based on attributes of user setup records in the user group, the matching rule, and attributes of the documents.

At 631, the user groups may be stamped to their matchable documents so that users in that group can access the matchable documents.

At 641, it may be determined if there is any change to the matching rule, which may be updating the matching rule, activating/deactivating the matching rule, or adding a new matching rule. If yes, the process may return to 625 to match the user groups and documents according to the rule change.

At 651, it may be determined if there is any change to the document attributes. If yes, the process may return to 625 to match the groups and documents according to the updated document attributes.

Figure 7:
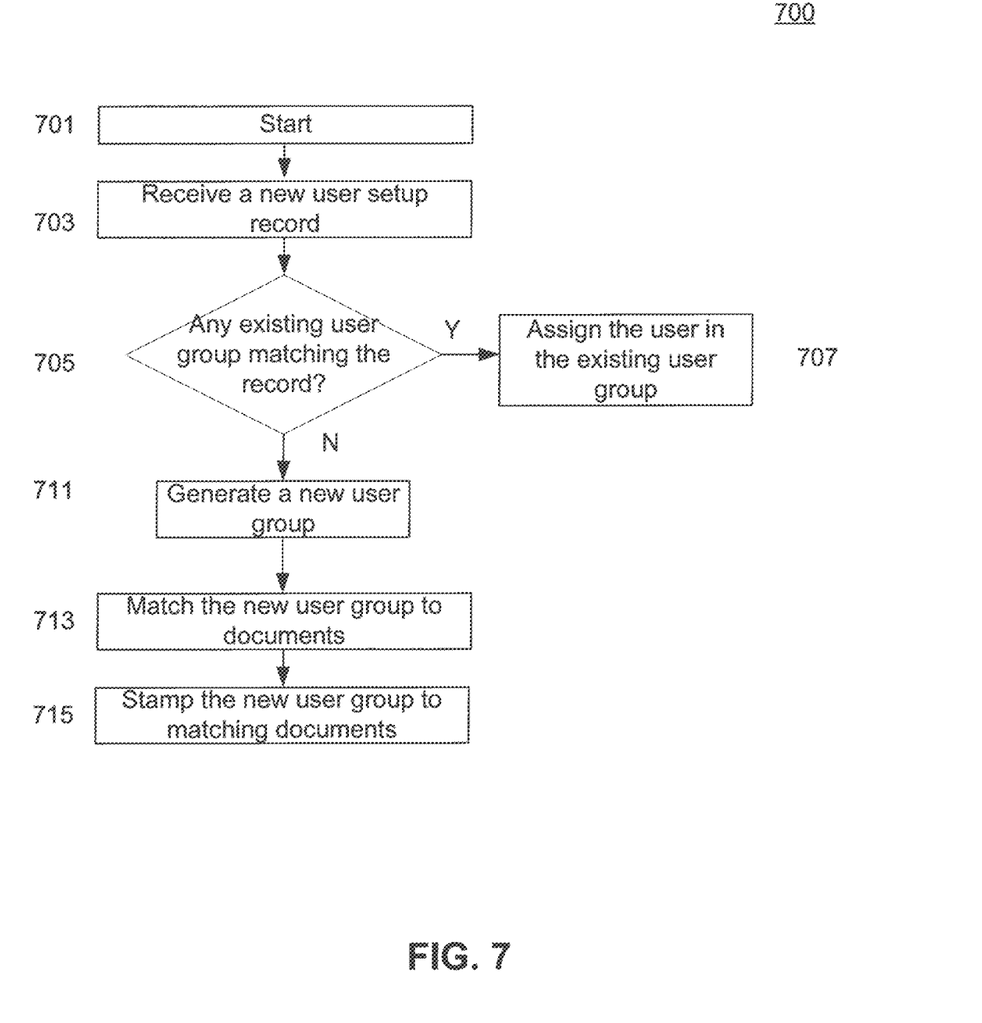
FIG. 7 illustrates an example flowchart of a method for controlling document access in a content management system according to one embodiment of the present invention.

FIG. 7 illustrates a flowchart of a method for controlling document access according to one embodiment of the present invention. The process may start at 701.

At 703, a new user setup record may be received via the user role setup module 1141 when a new user joins the enterprise or the role of an existing user changes.

At 705, the User group generating module 1142 may compare attributes of the new user setup record and attributes associated with each existing user groups and determine if any existing user group matches the new user setup record.

If yes, at 707, the user may be assigned to the existing user group that matches the new user setup record. The user may get access to all documents to Which the existing user group is stamped.

If no existing user group matches the new user setup record, a new user group may be generated at 711.

At 713, the matching module 1143 may match the new user group to the documents.

At 715, the new user group may be stamped to matchable documents, so that the user may access the stamped documents.

Figure 8:
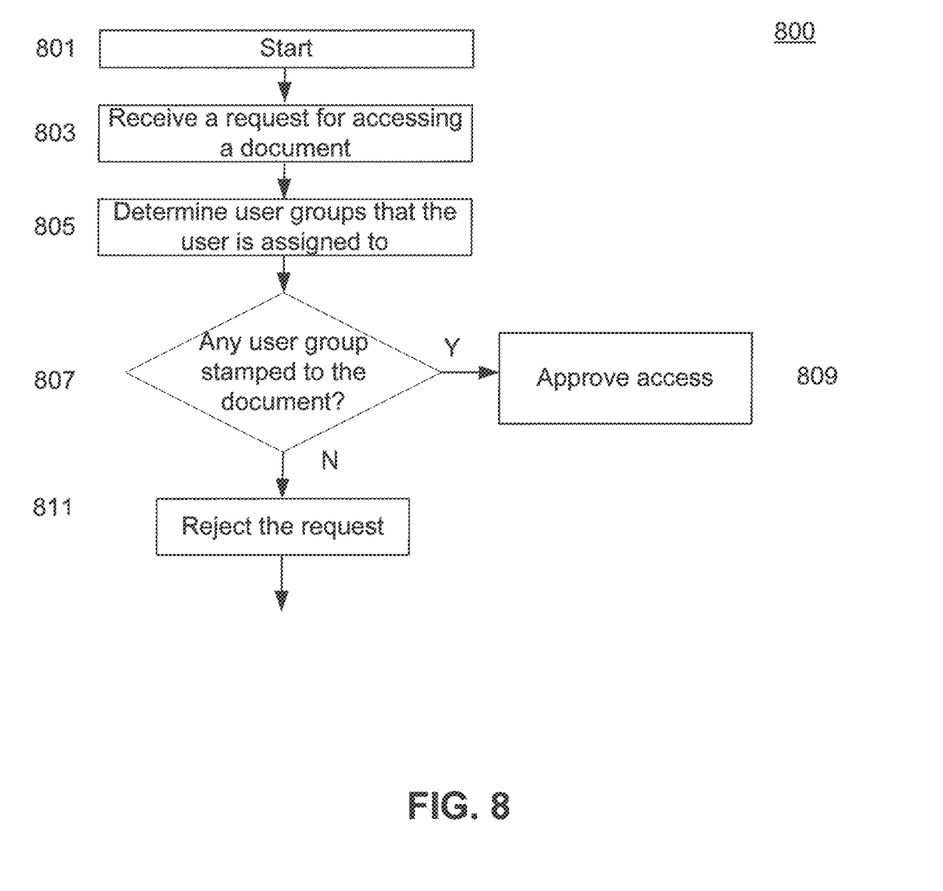
FIG. 8 illustrates an example flowchart of a method for controlling document access in a content management system according to one embodiment of the present invention.

FIG. 8 illustrates a flowchart of a method for controlling document access according to one embodiment of the present invention. The process may start at 801.

At 803, a request for accessing a document may be received from a user.

At 805, it may be determined, by the access management module 1145 in the content management server 112, the groups that the user is assigned to.

At 807, it may be determined, e.g., by the access management module 1145, if any of the groups that the user is assigned to is stamped to the document.

If yes, at 809, access to the document may be approved. Otherwise, at 811, the request may be rejected.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs. Examples of computer programs or computer code include machine code, for example is produced by a compiler, and files including higher-level code that are executed by a computer, an electronic component, or a microprocessor using an interpreter.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more.

What is claimed is:

1. A method for controlling document access in a content management system, wherein the content management system stores a first document and a second document and wherein each of the documents is associated with a set of attributes, the method comprising:

displaying a first user interface for receiving user setup records, wherein each user setup record comprises a user role field and a product field;

receiving and storing a first user setup record and a second user setup record, wherein the first user setup record comprises a first user role and a first product, and the second user setup record comprises a second user role and a second product;

generating a first user group and a second user group, wherein the first user group is associated with the first product and the second user group is associated with the second product;

assigning the first user to the first user group when attributes of the first user setup record satisfy requirements of the first user group, and assigning the second user to the second user group when attributes of the second user setup record satisfy requirements of the second user group, wherein requirements of the first user group comprise the first product;

displaying a second user interface for receiving definition of a matching rule for matching the user groups to the documents, wherein the second user interface comprises a first field of the first user setup record, and a window for receiving a first attribute of the first document which matches the first field of the first user setup record;

receiving definition of the matching rule; and determining that the first user group matches the first document based on the matching rule, the first user setup record, and attributes of the first document.

2. The method of claim 1, further comprising: associating the first user group to the first document to enable users in the first user group to access the first document.

3. The method of claim 1, wherein requirements of the first user group comprise a user role.

4. The method of claim 1, wherein requirements of the first user group comprise a geographic area.

5. The method of claim 1, further comprising: determining if there is any change to the matching rule.

6. The method of claim 5, wherein the change to the matching rule comprises: updating the matching rule, activating the matching rule, deactivating the matching rule, and adding a new matching rule.

7. The method of claim 6, further comprising: updating association between the user groups and the documents according to the change to the matching rule.

8. The method of claim 1, further comprising: determining if there is any change to attributes of the documents.

9. The method of claim 8, further comprising: updating association between the user groups and the documents according to a change to the attributes of the documents.

10. The method of claim 1, further comprising: receiving a third user setup record.

11. The method of claim 10, further comprising: determining that the third user setup record satisfies requirements of the first user group and assigning the third user to the first user group.

12. The method of claim 10, further comprising: determining that the third user setup record does not satisfy requirements of the first and second user groups, and generating a third user group based on the third user setup record.

13. The method of claim 12, further comprising: determining that the third user group matches the first document based on the matching rule, requirements of the third user group, and attributes of the first document.

14. The method of claim 13, further comprising: associating the third user group to the first document to enable users in the third user group to access the first document.

15. The method of claim 2, further comprising: removing the first user from the first user group when the first user setup record is deleted.

16. The method of claim 2, further comprising: when the first user setup record is updated, determining that the updated first user setup record meets requirements of the second user group, and reassigning the first user to the second user group.

* * * * *